United States Patent Office 3,310,092
Patented Mar. 21, 1967

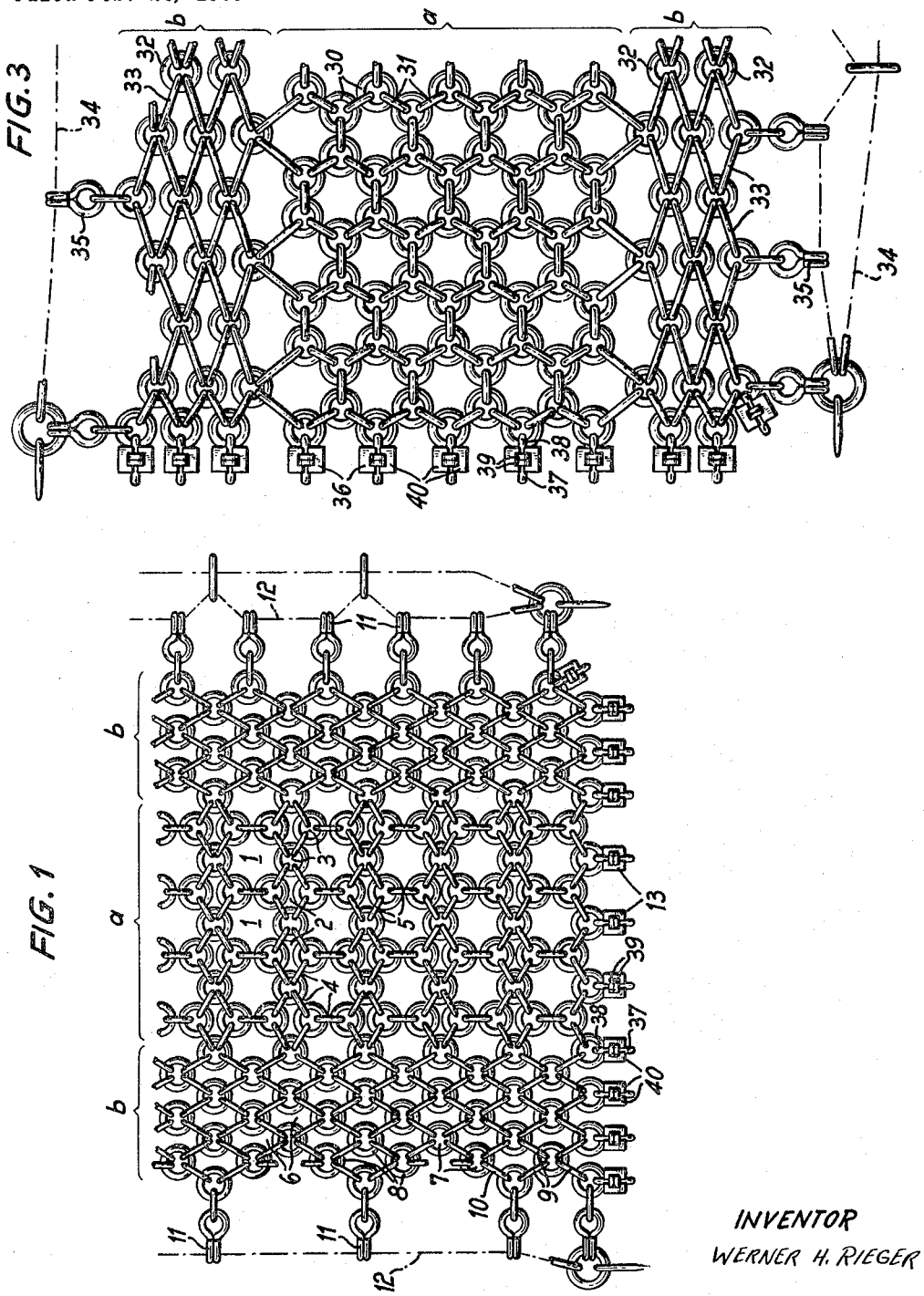

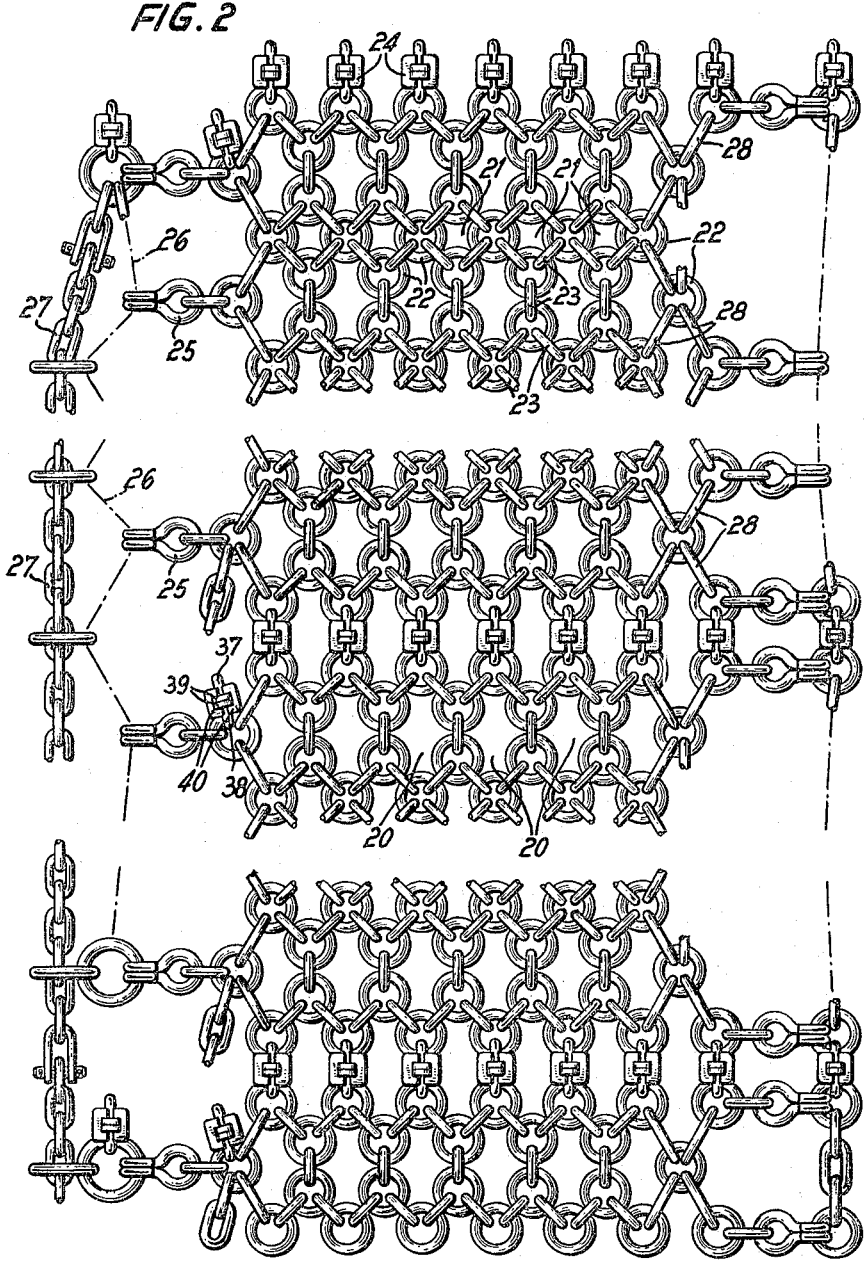

3,310,092
PROTECTIVE CHAINS FOR TIRES
Werner H. Rieger, Unterkochen, Wurttemberg, Germany, assignor to RUD-Kettenfabrik Rieger & Dietz, Unterkochen, Germany, a German firm
Filed Feb. 26, 1965, Ser. No. 435,579
Claims priority, application Germany, May 22, 1964, R 28,486; Oct. 6, 1964, R 29,282; Dec. 22, 1964, R 29,746
8 Claims. (Cl. 152—171)

This invention relates to protective chains for tires, and particularly to protective chains for the tires of vehicles, such as tractors, earth moving vehicles, and the like, which are used in very rough terrain, as, for example, in quarries.

It is an object of the invention to provide such protective chains having improved wearing characteristics.

It is another object to provide such protective chains whose ground engaging links are not subject to localized wear.

It is still another object to provide protective chains for tires which provide improved coverage for the tires.

It is a still further object to provide protective chains in which the use of expensive elements is minimized.

These and other objects which will appear are accomplished by the provision of chains having links generally parallel to the tire surface and other links generally transverse to that surface. The latter are so arranged as to be rotatable during use, thereby preventing the formation of local areas in which these links are flattened through wear. Specifically these perpendicular links are made in the form of circular rings, the diameter of the opening defined by each ring being of the order of twice the diameter of the material of which the parallel links are formed. If the portions of the parallel links with which these perpendicular rings are in engagement are flattened, the diameter of the openings defined by each ring can be even smaller.

To maximize the coverage of the tire by these chains the links which parallel the protective chains should also be in the form of rings. This eliminates the filler rings which have previously been proposed for interconnection with the parallel links.

It is particularly advantageous to make the parallel rings of such size that the opening defined by each such ring has a diameter of the order of three times the diameter of the material of which the perpendicular rings are formed.

The rings which are perpendicular to the tire surface, and which have an opening diameter of the order of twice the material diameter of the parallel rings, or less, are preferably provided only in those parts of the chain which are most used. The reason for this is that these perpendicular rings are relative expensive. Accordingly these perpendicular rings are preferably included only in those portions of the chains which cover the tire tread, while the perpendicular links in those portions of the chains covering the tire sidewalls are in the form of oval chain links.

A preferred embodiment of protective chains in accordance with the invention employs hexagons and quadrangles interspersed in a regularly recurring pattern, whose points are formed by rings parallel to the tire surface and whose sides are formed by rings perpendicular to the tire surface and having opening diameters of the order of twice the material diameter of the parallel rings, or less. In this embodiment, none of the rings parallel to the tire surface and within the borders of the center portion which is intended for application to the tire tread contacts less than three nor more than four adjacent rings with which it forms the pattern, thus forming an open area within each hexagon and quadrangle.

In another embodiment only the portion of the chains covering the tire tread is formed of such regularly distributed hexagons and quadrangles, or else solely of contiguous quadrangles. In this arrangement the points are formed of rings parallel to the tire surface and the sides of rings perpendicular to the tire surface. The portion of the chains covering the tire sidewalls consists of contiguous quadrangles, whose points are formed of rings arranged parallel to the tire surface, and whose sides are formed of oval links arranged perpendicular to the tire surface.

Finally it is desirable to assemble the protective chains out of individual segments joined to each other by chain locks. These are formed of two U-shaped chain links whose shank ends have flanges which fit into recesses in two adjacent, screwed-together plates.

For further details reference may be had to the accompanying drawings wherein
FIG. 1 is a plan view of one embodiment of the invention;
FIG. 2 is a plan view of another embodiment; and
FIG. 3 is a plan view of still another embodiment of the invention.

The tire protective chains of FIG. 1, to which reference may now be had, comprise a center portion $a$ which is intended for application to the tire tread. Portion $a$ consists of hexagons 1 and quadrangles 2. Points 3, as well as sides 4 of hexagons 1 and quadrangles 2, respectively, are formed of rings 5. The inner diameter of the rings which form sides 4 is approximately twice the diameter of the material of which the rings forming points 3 are constituted.

The side portions $b$ of the chains consist of contiguous squares 6, joined at their points 7 by means of rings 8 and having as sides oval chain links 10. Hooks 11 attach this network to side chains 12. The so-called chain locks 13 may be used to join the ends of the network portions to each other.

The chains of FIG. 2, to which reference may now be had, consists of hexagons 20 and squares 21, whose points are formed of horizontal rings 22 and whose sides are formed of vertical rings 23. The vertical rings 23 have a diameter of about $2b_1$ where $d_1$ is the diameter of the material constituting horizontal rings 22. The latter have a diameter of approximately $3d_2$, where $d_2$ is the diameter of the material constituting vertical rings 23.

Chain locks 24 serve to join together the separate portions of the network. Hooks 25 attach the network to side chains 26, which extend along the tire sidewalls when the chains are mounted on the tire. The chains are placed under tension via side chain 26 by means of stretcher chain 27. In the border areas of the network, which are intended to be placed against the tire sidewalls, the vertical links 28 are not in the form of rings, but are oval.

The opening diameter of vertical rings 23 may also be less than $2d$, provided the horizontal links 22 are made correspondingly thinner in those regions in which they pass through the vertical rings 23. Of course, the portions placed against the tire sidewalls may also be provided with rings instead of oval vertical links.

In FIG. 3, to which reference may now be had, there is shown a network portion $a$ intended to cover the tire tread. This portion consists of adjoining hexagons formed of rings 30 arranged parallel to the tire tread and rings 31 perpendicular to the tire surface. The perpendicular rings 31 have an opening diameter which is approximately twice the diameter of the material of which the parallel rings 30 are made. The network portions b intended to cover the sidewalls consist of rhomboids, built up from rings 32 arranged parallel to the tire surface and oval links 33 perpendicular to that surface. Side chains 34 are joined by hooks 35 to the protective chains. The latter consists of individual segments which are joined together by means of chain locks 36.

Each chain lock consists of two U-shaped half-links 37 and 38 provided with flanges 39 at their ends. These flanges fit into recesses in two adjoining retaining plates 40 which are joined together by a centrally located screw (not shown).

I claim:

1. Protective chain means for tires comprising: chain links arranged alternately perpendicular and parallel to the tire surface, said parallel links being in the form of rings, said perpendicular links being in the form of circular rings in those areas of said chain means covering the tire tread surface and each said perpendicular link defining an opening whose diameter is of the order of twice the diameter of the material constituting said parallel links and said perpendicular links being in the form of ovals in those areas of said chain means covering the tire sidewalls.

2. Protective chain means according to claim 1, characterized in that the diameter of the openings defined by said parallel links is of the order of three times the diameter of the material constituting said perpendicular rings.

3. Protective chain means for tires comprising six and four sided polygons interspersed in a regular pattern, the points of said polygons being formed of rings arranged parallel to the tire surface and the sides of said polygons being formed of rings arranged perpendicular to said tire surface, the openings defined by said perpendicular rings having a diameter of the order of twice the diameter of the material consititutng said parallel rings or less, none of the parallel rings contacting less than three nor more than four adjacent parallel rings, and said parallel rings forming and open area within each said polygons.

4. Protective chain means for tires comprising: squares arrayed in a periodic pattern, the points of said squares being formed by rings arranged parallel to the tire surface, and the sides of said squares being formed by rings arranged perpendicular to said tire surface, the diameter of the openings defined by said perpendicular rings being of the order of twice the diameter of the material constituting said parallel rings or less, none of the parallel rings contacting less than three nor more than four adjacent parallel rings, and said parallel rings forming an open area within each said squares.

5. A protective chain means for tires having a portion for covering the tire tread and other portions for covering the tire sidewalls, said first-mentioned portion comprising six sided and four sided polygons interspersed in a regular pattern, the points of said polygons being formed by rings arranged parallel to the tire surface and the sides of said polygons being formed of rings arranged perpendicular to the tire surface, the diameter of the openings defined by said perpendicular rings being of the order of twice the diameter of the material constituting said parallel rings or less, none of the parallel rings contacting less than three nor more than four adjacent parallel rings, and said parallel rings forming an open area within each said polygons, and said other portions comprising contiguous four sided polygons, the points of said last-mentioned polygons being formed of rings arranged parallel to the tire surface and the sides of said last-mentioned polygons being formed of oval links arranged perpendicular to the tire surface.

6. Protective chain means for tires comprising: a portion for covering the tire tread and other portions for covering the tire sidewalls, said first-mentioned portion comprising hexagons arranged in a periodic array, the points of said hexagons being formed of rings arranged parallel to the tire surface and the sides of said hexagons being formed of rings arranged perpendicular to the tire surface, said perpendicular rings defining openings whose diameter is of the order of twice the diameter of the material constituting said parallel rings or less, none of the parallel rings contacting less than three nor more than four adjacent parallel rings, and said parallel rings forming an open area within each said hexagons, and said other portions comprising contiguous quadrangles, the points of said quadrangles being formed of rings arranged parallel of the tire surface and the sides of said quadrangles being formed of oval links arranged perpendicular to the tire surface.

7. Protective chain means for tires comprising: network-like segments formed of chain links arranged parallel and perpendicular to the tire surface, respectively, said parallel links being in the form of rings, and said perpendicular links being in the form of circular rings at least in the areas covering the tire tread and defining openings whose diameter is of the order of twice the diameter of the material constituting said parallel rings or less, none of the parallel rings contacting less than three nor more than four adjacent parallel rings, and said parallel rings forming an open area within each said segments, and chain lock means joining said segments together, said last-named means being distributed over the tire in plural rows extending transversely to the plane of rotation of the tire.

8. Protective chain means for tires comprising: network-like segments formed of chain links arranged parallel and perpendicular to the tire surface, respectively, said parallel links being in the form of rings, and said perpendicular links being in the form of circular rings at least in the areas covering the tire tread and defining openings whose diameter is of the order of twice the diameter of the material constituting said parallel rings or less, and chain lock means joining said segments together, said last-named means being distributed over the tire in plural rows extending transversely to the plane of rotation of the tire further characterized in that said chain lock means are formed of two U-shaped chain links having flanges at their shank ends, said flanges fitting into recesses in two retaining plates joined together.

References Cited by the Examiner

UNITED STATES PATENTS

| 905,877 | 12/1908 | Hewitt | 152—171 |
| 1,019,830 | 3/1912 | Pejchar | 152—171 X |
| 1,145,305 | 7/1915 | Graves | 152—171 X |
| 1,229,244 | 6/1917 | Eckert | 152—239 |

FOREIGN PATENTS

| 1,350,323 | 8/1963 | France. |

ARTHUR L. LA POINT, *Primary Examiner.*

MILTON BUCHLER, *Examiner.*

C. W. HAEFELE, *Assistant Examiner.*